March 15, 1960  F. K. H. NALLINGER  2,928,499
LUBRICATING SYSTEM FOR AN INTERNAL COMBUSTION ENGINE
Filed March 26, 1956
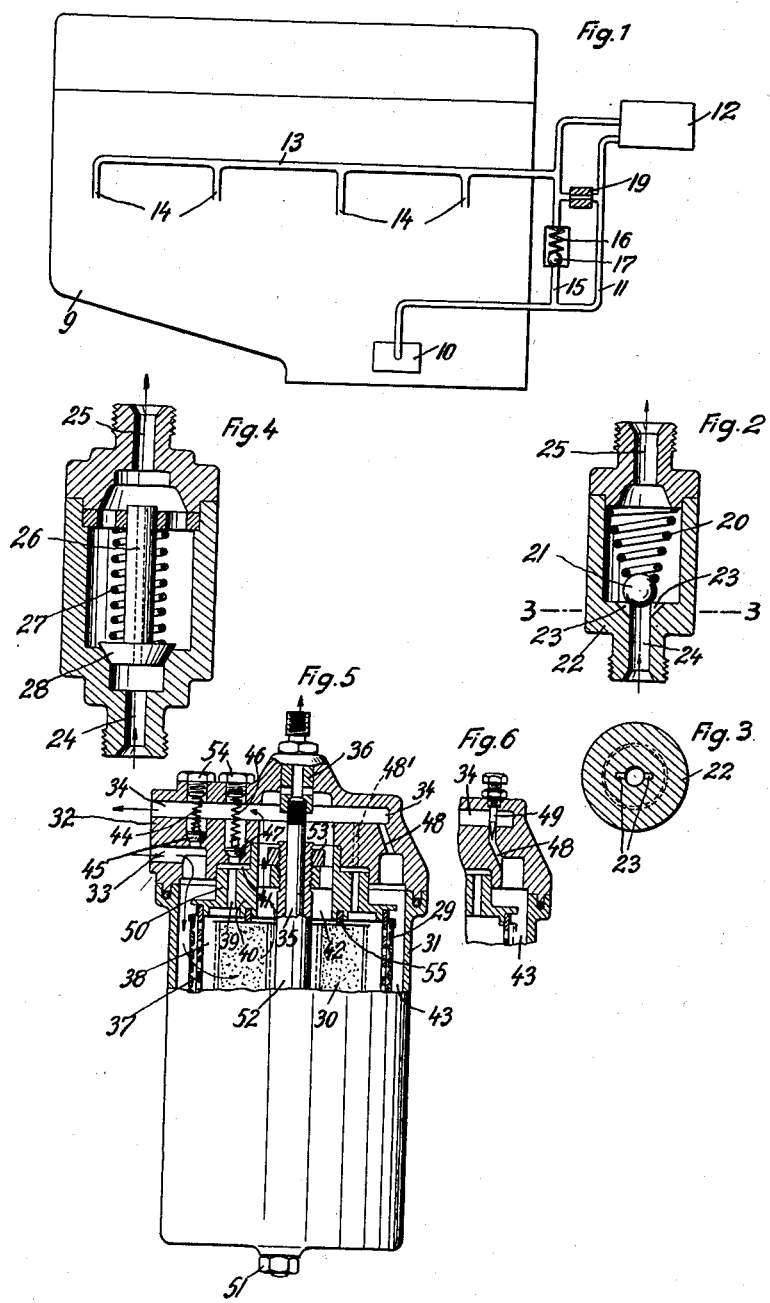
Inventor
FRIEDRICH K. H. NALLINGER
BY Dicke and Craig
ATTORNEYS.

United States Patent Office 2,928,499
Patented Mar. 15, 1960

2,928,499

LUBRICATING SYSTEM FOR AN INTERNAL COMBUSTION ENGINE

Friedrich K. H. Nallinger, Stuttgart, Germany, assignor to Daimler-Benz Aktiengesellschaft, Stuttgart-Unterturkheim, Germany Application March 26, 1956, Serial No. 573,802

11 Claims. (Cl. 184—6)

My invention relates to the lubricating system for an internal combustion engine and, more particularly, to a system comprising a lubricant-dispensing conduit, a lubricating pump driven by the engine, and a filter interposed therebetween for the purpose of continuously cleaning the lubricant.

A preferred type of filters used in such systems is the so-called "microfilter" consisting of a body of porous material through which the lubricant is pressed. After a continued period of operation, however, such filter is liable to be clogged by the impurities accumulated therein and, as a result, offers a high resistance to the passage of the lubricant and may eventually prevent the passage thereof altogether. For this reason, it is the general practice to provide a relief valve bypassing the filter, such relief valve being adjusted to open in response to an excessive pressure of the lubricant thus permitting the latter to be supplied to the lubricating points of the engine even though such lubricant will be cleaned no longer.

The prior lubricating systems comprising a microfilter and a relief valve bypassing the same may fail under certain conditions of operation, however. When the engine is idling or is operating at a low speed, the lubricating pump driven by the engine may not be able to produce a sufficient pressure to open the relief valve or to overcome the resistance of the filter. As a result, the lubricating points of the engine will not be supplied with lubricant. This faulty condition of operation is particularly liable to happen where the pump has a high leakage due to wear and where the lubricant is highly heated and, therefore, has a low viscosity.

It is the object of the present invention to provide an improved lubricating system in which the afore-described shortcomings of the prior lubricating systems are avoided. More particularly, it is an object of my invention to provide an improved lubricating system including a filter and a relief valve bypassing the same which ensures a supply of lubricant to the engine even when the same is idling or running at a low speed, and even when the pump has a comparatively high leakage due to wear and due to low viscosity of the lubricant.

It is a further object of the present invention to provide a lubricating system including a filter which consists of a microfilter formed by a body of porous material and of a screen, such filter being of compact structure lending itself to manufacture at low costs and being reliable in operation and permitting easy disassembly and exchange of the body of porous material.

Further objects of my invention will appear from a detailed description of a number of preferred embodiments of the invention following hereinafter with reference to the drawings, it being understood that the terms and phrases used in such detailed description have been chosen for the purpose of illustration rather than that of restriction or limitation of the invention. The features of novelty for which patent protection is sought will be pointed out in the appended claims.

In the drawings,

Fig. 1 illustrates an internal combustion engine provided with the novel lubricating system, the latter being shown more or less diagrammatically, Fig. 2 is an axial section taken through a relief valve forming part of the novel lubricating system, Fig. 3 is the cross section of the relief valve shown in Fig. 2, the section being taken along the line 3—3 of Fig. 2, Fig. 4 is a sectional view similar to that of Fig. 2 of a modified relief valve, Fig. 5 is an elevation of an improved filter housing including a coarse filter, a fine filter, a pair of relief valves, and a pair of restricted passageways, such filter housing being partly shown in axial section, and Fig. 6 is a view similar to that of Fig. 5 of a slight modification of the filter housing shown therein.

The internal combustion engine 9 shown in Fig. 1 is geared to a lubricating pump 10 to drive the same and is equipped with a lubricant-dispensing conduit 13 having a plurality of discharge ports 14 leading to the lubricating points of the engine. A filter 12 is interposed between the pump 10 and the conduit 13. Moreover, a duct 15 provided with a relief valve 16, 17 bypasses the filter 12.

For the purpose of the present invention a restricted passageway 19 is provided which bypasses both the relief valve 16, 17 and the filter 12. This passageway permits the pump, when feeding the lubricant during low speed of the engine at a low pressure insufficient to open the relief valve 17 against the pressure of the spring 16 or to overcome the resistance of the filter 12, to supply the conduit 13 with the lubricant. Should it happen after operation of the engine over a continued period of time that the resistance of the filter 12 has unduly increased by the accumulation of foreign matter therein, and should the pump 10 produce insufficient pressure to open the relief valve, the lubricant supplied through the restricted passageway 19 will still be sufficient to ensure lubrication of the engine and, more particularly, of the crankshaft bearings supplied by the discharge ports 14 of the conduit 13. The throttling effect of the restricted passageway 19 is so chosen that the quantity of oil supplied through the passageway 19 will suffice for the idling operation of the engine, but is so limited that during operation of the engine under load only a negligible portion of the entire quantity of lubricant circulated through the engine flows through the passageway, whereas the major portion of the oil is forced to pass the filter 12 to be cleaned therein. Thus, the filter 12 will be interposed in the main branch of the stream of lubricant when the engine is operating under load, and during the idling of the engine or during the operation at extremely low speeds only will the filter be ineffective. Preferably, the relief valve is composed of a housing member, such as 22, shown in Fig. 2, of a ball, such as 21, seated thereon, and of a spring, such as 20, coordinated to the ball 21 and tending to press the same upon the seat. In a relief valve of this type, the restricted passageway may be formed by a groove, such as 23, provided in the seat of the valve. If desired, a pair of such grooves 23 may be provided as shown in Figs. 1 and 3. The oil entering the housing 22 through the inlet port 24 may pass through the slots 23 to the outlet port 25 even should the pressure of the lubricant be insufficient to lift the ball 21 from the valve seat.

Alternatively, a relief valve as shown in Fig. 4 may be employed. In this relief valve the valve housing is provided with a conical seat cooperating with a poppet valve having a valve stem provided with the longitudinal bore 26 and a valve head 28 cooperating with the valve seat. The bore 26 constitutes a restricted passageway permanently connecting the inlet port 24 of the valve housing with the outlet port 25 thereof. The stem of the valve is surrounded by the spring 27 tending to keep the relief valve closed.

Preferably, a housing is provided for the filter, such as 12, and for the relief valve, such as 16, 17, the restricted passageway 19 being provided within such housing. While in Fig. 1 the filter is diagrammatically indicated by a rectangle 12, it is shown in greater detail in Fig. 5. It comprises a substantially cylindrical cup-shaped housing 31 provided with a cover 32. The cover 32 has an inlet 33 and an outlet 34. The cover 32 provides a stepped seat for a member 50 constituting a means for mounting a coarse filter 29 and a fine filter or microfilter 30 within the housing with a space 38 between such filters so as to establish a lubricant circuit from the inlet 33 through the coarse filter 29, the space 38 and the fine filter 30 to the outlet 34. The coarse filter 29 is formed by a sheet metal cylinder provided with a multiplicity of circumferential slots supported on its inside by a perforated cylindrical sheet metal member 37. The microfilter 30 is formed by a substantially cylindrical hollow body of a porous material surrounded by the perforated sheet metal member 37 and held in position by a centrally disposed tubular stem 52 which is connected to the bottom of a cup-shaped housing 31 by a nut 51 and extends through the member 50 being fixed thereto by a nut 53. Preferably, the stem 52 is hollow for the accommodation of a bolt 35 screw-threaded therein and having its upper end in threaded engagement with a nipple inserted in a bore of the cover 32 and being seated thereon. During normal operation the lubricant circulates through the housing along the path indicated by the arrows extending from the inlet 33 downwardly into the peripheral space surrounding the coarse filter 29, then through the latter to the space 38 between the two filters, and thence through the fine filter 30. In the interior space of the fine filter accommodating the bolt 52 the lubricant passes upwardly and flows through bores of the member 50 into a central bore of the cover 32 and thence through the outlet 34 communicating with such central bore.

For the purpose of the present invention, the cover 32 is provided with a first duct connecting the inlet 33 with the outlet 34, a first relief valve 45 having a spring 44 being provided in said first duct. Moreover, the filter housing is provided with a second duct 39 extending through the mounting member 50 and communicating with an annular space 41 from which the duct further extends through the cover 32 into the outlet 34. In this duct there is inserted a second relief valve 47 provided with a spring 46.

For the purpose of the present invention, a restricted passageway 48 is provided in the cover 32, such passageway bypassing the first relief valve 45. As shown in Fig. 6, means for adjusting the throttling effect of the restricted passageway 48 may be provided, for instance in form of a needle valve 49 adjusting the cross section of the passageway 48. This needle valve is adjustable from the outside.

If desired, the filter may be provided with a second restricted passageway bypassing the second relief valve 47. In the embodiment shown, this second restricted passageway may be formed by a bore 48′ provided in the cover 32 and connecting the space 34 with the annular space 41.

The filter housing described offers the advantage of easy disassembly. Upon unscrewing the nipple 36 the cover 32 may be readily removed from the housing 31 and then permits ready access to the filters for exchange thereof.

In operation the lubricant normally flows from the inlet 33 into the outer annular space 43 referred to in the claims as the first space whence it flows through filter 29 into the central annular space 38 referred to in the claims as the second space and thence through the microfilter 30 to space 42 referred to in the claims as the third space and from there to the outlet 34.

Preferably, the loading springs 44 and 46 are adjustable and, for this reason, abut against threaded plugs 54. Should it happen after continued operation of the engine over a long period of time that both the coarse filter 29 and the fine filter 30 will be obstructed by the accumulation therein of foreign matter, the lubricant may flow directly from the inlet 33 to the outlet 34 through the restricted bore 48 if the pressure of the lubricant should be insufficient to lift the relief valve 45. Upon increase of the pressure, however, the lubricant may pass the relief valve 45. As long, however, as the coarse filter 29 will remain sufficiently unobstructed to permit the lubricant to pass, such lubricant may flow through the restricted passageway 48′ or, if its pressure is sufficient, through the check valve 47 to the outlet 34 if the fine filter 30 should be obstructed. The fine filter 30 is provided with an end plate abutting against a sealing ring 55 which is inserted in the bottom face of the mounting member 50 and serves to separate the outer space 38 from the cavity 42 communicating with the internal space of the fine filter 30. If desired, the passageway 48 may be disposed adjacent to the valve 45.

From the foregoing it will appear that my invention avoids the disadvantage of the prior lubricating systems. The restricted passageway bypassing the filter has such a cross section that under normal conditions of operation at a high speed the majority of the lubricant will flow through the filter, and that at an operation at a low speed or with a high resistance of the filter the majority of the lubricant will pass through the restricted passageway.

While the invention has been described in connection with a number of preferred embodiments thereof, it will be understood that it is capable of further modification, and this application of the invention following, in general, the principles of the invention and including such departures from the present disclosure as come within known or customary practice in the art to which the invention pertains, and as fall within the scope of the invention or the limits of the appended claims.

What I claim is:

1. Lubricating system for an internal combustion engine comprising a lubricating pump driven by the engine, a lubricant-dispensing conduit, a filter having an inlet and an outlet, said inlet communicating with said pump and said outlet communicating with said conduit, and a relief valve having an inlet and an outlet, the inlet of said relief valve permanently communicating with the inlet of said filter and the outlet of said relief valve permanently communicating with the outlet of said filter, said relief valve by-passing said filter, a restricted passage-way coordinated to at least one of the aforementioned elements of the combination for establishing a direct permanent communication between at least one of said inlets and at least one of said outlets to afford said pump a possibility of supplying said conduit with lubricant, when feeding the lubricant during low speed of said engine at a low pressure which is insufficient to open said relief valve and insufficient to overcome the resistance of said filter.

2. System as claimed in claim 1 further comprising means for adjusting the throttling effect of said restricted passageway.

3. System as claimed in claim 1 further comprising a needle valve for adjusting the cross section of said restricted passageway.

4. System as claimed in claim 1 in which said relief valve is composed of a housing member having a seat, of a ball seated thereon, and of a spring coordinated to said ball and tending to press the same upon said seat, said restricted passageway being formed by a groove in said seat.

5. System as claimed in claim 1 in which a common housing is provided for said filter and for said relief valve, said restricted passageway being provided within said housing.

6. A filter for the lubricant system of an internal combustion engine comprising a housing provided with an inlet and an outlet, a coarse filter, a fine filter, means for mounting said filters in said housing with a space between said filters and for conducting a stream of lubricant from said inlet through said coarse filter, said space and said fine filter to said outlet, a first duct connecting said inlet with said outlet, a first relief valve in said duct, a second duct connecting said space with said outlet, a second relief valve in said second duct, said means being provided with a restricted passageway by-passing said first relief valve.

7. Filter as claimed in claim 6 in which said means are provided with a second restricted passageway by-passing said second relief valve.

8. A filter for the lubricant system of an internal combustion engine comprising a cup-shaped housing, a cover, means for releasably securing said cover in position on said housing, a stem coaxially disposed in said housing, an annular member fixed to said stem in spaced relationship to the bottom of said housing and in engagement with said cover, a cylindrical screen in said housing in coaxial relationship to said stem extending between said annular member and the bottom of said housing being spaced from the side wall of the latter to confine a first space therewith, a micro-filter formed by a substantially cylindrical body of porous material having an axial bore and being mounted within said screen in spaced relationship therefrom to confine a second space therewith and extending between said annular member and the bottom of said housing, said stem extending through said bore, said member being provided with a cavity which communicates with said bore and constitutes a third space, said cover being provided with a lubricant inlet port communicating with said first space, with a lubricant discharge port and with a conduit establishing a direct communication between said lubricant discharge port and said third space to be supplied with lubricant that has flown inwardly through said screen and through said micro-filter, a first spring-controlled relief valve having an inlet and an outlet and mounted in said cover, said inlet permanently communicating with said inlet port and said outlet permanently communicating with said discharge port, a first restricted passage-way being provided in said cover leading from said inlet to said outlet, communicating ducts being provided in said cover and in said annular member to constitute a direct communication between said second and said discharge conduit, a second relief valve mounted in one of said communicating ducts to afford flow of lubricant from said second space to said discharge conduit under pressure, and a second restricted passage-way provided in said cover leading from said second space to said discharge conduit for by-passing said second relief valve.

9. Lubricating system for an internal combustion engine having elements to be lubricated, said system comprising a lubricating pump driven by the engine and provided with an outlet, conducting means connected to said pump and to said elements for conducting a stream of lubricant from said outlet to said elements, a filter screen co-ordinated to said conducting means and arranged across said stream for filtering same in a coarse manner, a micro-filter of porous material co-ordinated to said conducting means and arranged downstream of said filter screen to extend across said stream for filtering same in a fine manner, and a relief valve having an inlet and an outlet and co-ordinated to said conducting means so that said inlet permanently communicates with said stream at a point located upstream of said filter screen and that said outlet permanently communicates with said stream at a point located downstream of said microfilter, said conducting means being provided with a restricted passage-way leading from said inlet to said outlet establishing a direct permanent communication therebetween to afford the pump a possibility of supplying said elements with lubricant, when feeding the lubricant during low speed of said engine at a low pressure which is insufficient to open said relief valve and insufficient to overcome the resistance of said filters.

10. Lubricating system for an internal combustion engine having elements to be lubricated, said system comprising a lubricating pump driven by the engine and provided with an outlet, conducting means connected to said pump and to said elements for conducting a stream of lubricant from said outlet to said elements, a filter screen co-ordinated to said conducting means and arranged across said stream for filtering same in a coarse manner, a micro-filter of porous material co-ordinated to said conducting means and arranged downstream of said filter screen to extend across said stream for filtering same in a fine manner, and a relief valve having an inlet and an outlet and co-ordinated to said conducting means so that said inlet permanently communicates with said stream at a point located downstream of said filter screen and upstream of said micro-filter and that said outlet permanently communicates with said stream at a point located downstream of said micro-filter, said conducting means being provided with a restricted passage-way leading from said linet to said outlet establishing a direct permanent communication therebetween to afford the pump a possibility of supplying said elements with lubricant, when feeding the lubricant during low speed of said engine at a low pressure which is insufficient to open said relief valve and insufficient to overcome the resistance of said micro-filter.

11. System as claimed in claim 10 further comprising a second relief valve having an inlet and an outlet and co-ordinated to said conducting means so that the inlet of said second relief valve permanently communicates with said stream at a point located upstream of said filter screen and that the outlet of said second relief valve permanently communicates with said stream at a point located downstream of said micro-filter, said conducting means being provided with a second restricted passage-way leading from the inlet of said second relief valve to at least one of said outlets establishing a direct permanent communication therebetween to afford the pump a possibility of supplying said elements with lubricant, when feeding the lubricant during low speed of said engine at a low pressure which is insufficient to open said relief valve and insufficient to overcome the resistance of said filter screen, if the latter should get clogged.

References Cited in the file of this patent

UNITED STATES PATENTS

| | | |
|---|---|---|
| 1,656,200 | Horning | Jan. 17, 1928 |
| 1,857,651 | McKinley | May 10, 1932 |
| 2,602,547 | Floss | July 8, 1952 |

FOREIGN PATENTS

| | | |
|---|---|---|
| 293,745 | Great Britain | Apr. 25, 1929 |
| 709,897 | Great Britain | June 2, 1954 |